(12) United States Patent
Li (Lee)

(10) Patent No.: US 10,789,769 B2
(45) Date of Patent: Sep. 29, 2020

(54) SYSTEMS AND METHODS FOR IMAGE STYLE TRANSFER UTILIZING IMAGE MASK PRE-PROCESSING

(71) Applicant: CyberLink Corp., Shindian, Taipei (TW)

(72) Inventor: Jhe-Wei (Wayne) Li (Lee), New Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 0 days.

(21) Appl. No.: 16/391,241

(22) Filed: Apr. 22, 2019

(65) Prior Publication Data
US 2020/0074722 A1     Mar. 5, 2020

Related U.S. Application Data

(60) Provisional application No. 62/727,092, filed on Sep. 5, 2018.

(51) Int. Cl.
*G06T 15/50*     (2011.01)
*G06F 3/0484*     (2013.01)
(Continued)

(52) U.S. Cl.
CPC ........ *G06T 15/503* (2013.01); *G06F 3/04842* (2013.01); *G06T 5/50* (2013.01); *G06T 11/00* (2013.01)

(58) Field of Classification Search
None
See application file for complete search history.

(56) References Cited

U.S. PATENT DOCUMENTS

| 7,365,744 B2 | 4/2008 | Fang et al. |
| 8,550,367 B2 | 10/2013 | Fan et al. |

(Continued)

FOREIGN PATENT DOCUMENTS

| CN | 104239855 B | 12/2014 |
| CN | 106778928 A | 5/2017 |

(Continued)

OTHER PUBLICATIONS

Castillo et al. "Son of Zorn's Lemma: Targeted Style Transfer Using Instance-Aware Semantic Segmentation" Department of Computer Science, University of Maryland, College Park.

(Continued)

*Primary Examiner* — YuJang Tswei
(74) *Attorney, Agent, or Firm* — McClure, Qualey & Rodack, LLP (57) ABSTRACT

A computing device obtains target multimedia and obtains a style digital image depicting a style pattern to be incorporated into the target multimedia. The computing device extracts an image mask from the style digital image, the image mask depicting the style pattern. The computing device generates a modified image mask from the image mask and blends the modified image mask with the target multimedia to generate a modified target digital multimedia. The computing device generates, by an artificial intelligence processor, a final target digital multimedia based on the modified target digital multimedia and the style digital image.

17 Claims, 4 Drawing Sheets
(1 of 4 Drawing Sheet(s) Filed in Color)

(51) Int. Cl.
*G06T 5/50* (2006.01)
*G06T 11/00* (2006.01)

(56) References Cited

U.S. PATENT DOCUMENTS

| | | | |
|---|---|---|---|
| 9,053,568 | B2 | 6/2015 | Webb et al. |
| 9,594,977 | B2 | 3/2017 | Lin et al. |
| 9,857,953 | B2 | 1/2018 | Sunkavalli et al. |
| 9,881,413 | B2 | 1/2018 | Fiser et al. |
| 9,922,432 | B1 | 3/2018 | Risser |
| 2008/0051989 | A1* | 2/2008 | Welsh .................. G06T 17/05 701/532 |
| 2017/0213112 | A1* | 7/2017 | Sachs .................. G06T 7/90 |
| 2018/0082407 | A1 | 3/2018 | Rymkowski et al. |
| 2018/0158224 | A1 | 6/2018 | Bethge et al. |

FOREIGN PATENT DOCUMENTS

| | | |
|---|---|---|
| CN | 106952224 A | 7/2017 |
| CN | 107464210 A | 12/2017 |
| CN | 107578367 A | 1/2018 |
| WO | 2017077121 A1 | 5/2017 |
| WO | 2018075927 A1 | 4/2018 |
| WO | 2018111786 A1 | 6/2018 |

OTHER PUBLICATIONS

Wang et al. "Artistic Style Transfer" EE 368: Digital Image Processing, Stanform University.
"Neural Style Transfer" http://www.renom.jp/notebooks/tutorial/image_processing/neural-style-transfer/notebook.html (printed Apr. 24, 2019).
Gatys et al. "Image Style Transfer Using Convolutional Neural Networks" 2016 IEEE Conference on Computer Vision and Pattern Recognition (CVPR). Jun. 27-30, 2016.
"Neural Artwork Style Transfer" https://cloudinary.com/documentation/neural_artwork_style_transfer_addon (printed Apr. 24, 2019).
Johnson et al. "Perceptual Losses for Real-Time Style Transfer and Super-Resolution" Department of Computer Science, Stanford University.
"Neural Style Transfer in Keras", Marko Jerkic, Jan. 25, 2018.

\* cited by examiner

SYSTEMS AND METHODS FOR IMAGE STYLE TRANSFER UTILIZING IMAGE MASK PRE-PROCESSING

CROSS-REFERENCE TO RELATED APPLICATION

This application claims priority to, and the benefit of, U.S. Provisional Patent Application entitled, "Refinement of Style Transfer Based on Image Mask Pre-processing," having Ser. No. 62/727,092, filed on Sep. 5, 2018, which is incorporated by reference in its entirety.

TECHNICAL FIELD

The present disclosure generally relates to systems and methods for performing image style transfer on target multimedia utilizing image mask pre-processing.

SUMMARY

In accordance with one embodiment, a computing device obtains target multimedia and obtains a style digital image depicting a style pattern to be incorporated into the target multimedia. The computing device extracts an image mask from the style digital image, the image mask depicting the style pattern. The computing device generates a modified image mask from the image mask and blends the modified image mask with the target multimedia to generate a modified target digital multimedia. The computing device generates, by an artificial intelligence processor, a final target digital multimedia based on the modified target digital multimedia and the style digital image.

Another embodiment is a system that comprises a memory storing instructions and a processor coupled to the memory. The processor is configured by the instructions to obtain target multimedia and obtain a style digital image depicting a style pattern to be incorporated into the target multimedia. The processor is further configured to extract an image mask from the style digital image, the image mask depicting the style pattern. The processor is further configured to generate a modified image mask from the image mask and blend the modified image mask with the target multimedia to generate a modified target digital multimedia. The processor is further configured to generate, by an artificial intelligence processor, a final target digital multimedia based on the modified target digital multimedia and the style digital image.

Another embodiment is a non-transitory computer-readable storage medium storing instructions to be implemented by a computing device having a processor, wherein the instructions, when executed by the processor, cause the computing device to obtain target multimedia and obtain a style digital image depicting a style pattern to be incorporated into the target multimedia. The processor is further configured to extract an image mask from the style digital image, the image mask depicting the style pattern. The processor is further configured to generate a modified image mask from the image mask and blend the modified image mask with the target multimedia to generate a modified target digital multimedia. The processor is further configured to generate, by an artificial intelligence processor, a final target digital multimedia based on the modified target digital multimedia and the style digital image.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

The patent or application file contains at least one drawing executed in color. Copies of the patent or patent application publication with color drawing(s) will be provided by the Office upon request and payment of the necessary fee.

DETAILED DESCRIPTION

Figure 1:
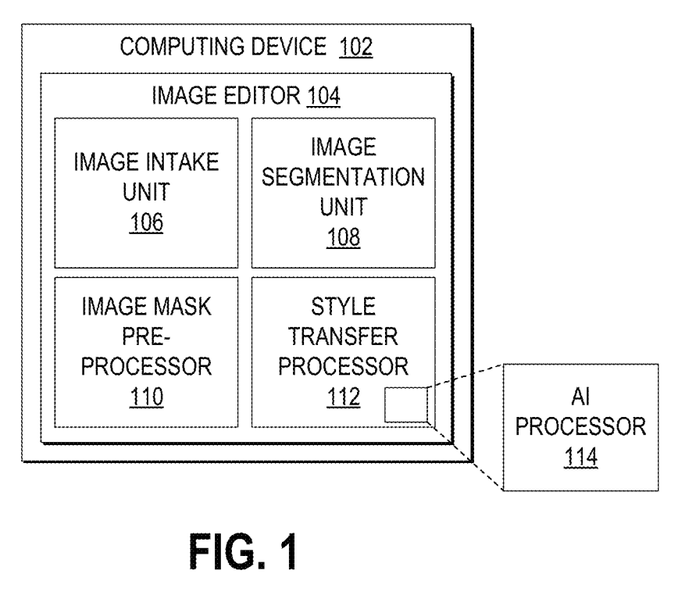
FIG. 1 is a block diagram of a computing device for performing image style transfer using image mask pre-processing in accordance with various embodiments of the present disclosure.

There is a need for an improved method for transferring patterns depicted in a sample image to target multimedia. Various embodiments are disclosed for performing image style transfer using image mask pre-processing. A description of a system for performing image style transfer utilizing image mask pre-processing is now described followed by a discussion of the operation of the components within the system. FIG. 1 is a block diagram of a computing device 102 in which the techniques for performing image style transfer disclosed herein may be implemented. The computing device 102 may be embodied as a computing device such as, but not limited to, a smartphone, a tablet computing device, a laptop, and so on.

An image editor 104 executes on a processor of the computing device 102 and includes an image intake unit 106, an image segmentation unit 108, an image mask pre-processor 110, and a style transfer processor 112. The image intake unit 106 is configured to obtain target multimedia as well as a style digital image depicting a style pattern to be incorporated into the target multimedia.

As one of ordinary skill will appreciate, the target multimedia obtained by the image intake unit 106 may comprise digital images encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. Alternatively, the target multimedia may comprise videos encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The image segmentation unit 108 is configured to extract an image mask from the style digital image, where the image mask depicts the style pattern. In the context of the present disclosure, the style pattern may include any decorative design portrayed in an object (e.g., painting, fabric texture, painting style of a famous painter, pattern) depicted in a digital image where a user wishes to incorporate or blend the decorative design into the content of target multimedia.

As described in more detail below, the image mask pre-processor 110 is configured to generate a modified image mask from the image mask, and the style transfer processor 112 is configured to blend the modified image mask with the target multimedia to generate a modified target digital multimedia. The style transfer processor 112 includes an artificial intelligence (AI) processor 114 configured to generate a final target digital multimedia based on the modified target digital multimedia and the style digital image, where the AI processor 114 is trained utilizing the style digital image and an image dataset by applying an artificial intelligence technique or a machine learning technique.

For some embodiments, the AI processor 114 is embodied as a convolutional neural network, which includes several convolutional layers and residual blocks. The convolutional layers perform the following convolution operation:

$$f[x,y]*g[x,y]=\Sigma_{n_1=-\infty}^{\infty}\Sigma_{n_2=-\infty}^{\infty}f[n1,n2]\cdot g[x-n1,y-n2],$$

where f[x, y] represents the input and g[x, y] represents the filter. The residual blocks perform the following operation: H(x)=F(x)+x.

Figure 2:
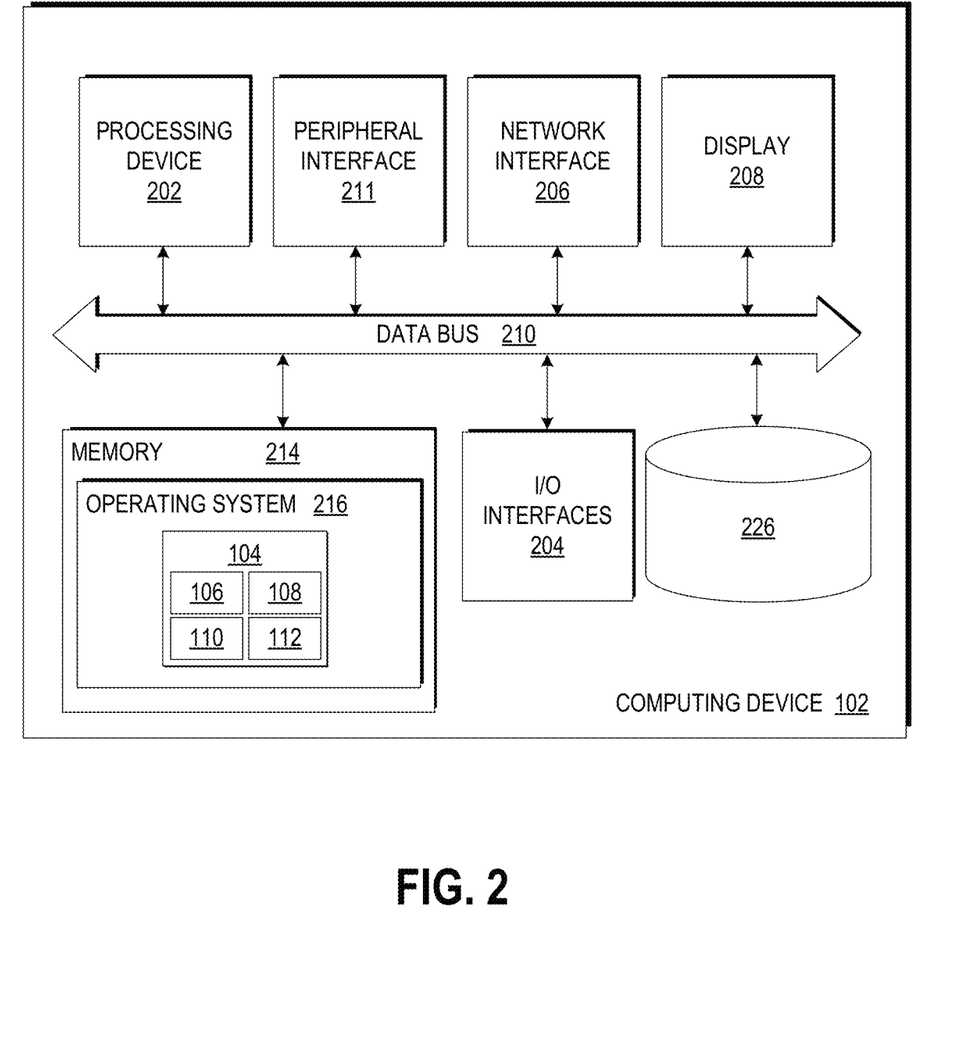
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multi-processor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202, thereby causing the processing device 202 to perform the operations/functions disclosed herein. One of ordinary skill in the art will appreciate that the memory 214 can, and typically will, comprise other components which have been omitted for purposes of brevity. For some embodiments, the components in the computing device 102 may be implemented by hardware and/or software.

Input/output interfaces 204 provide any number of interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
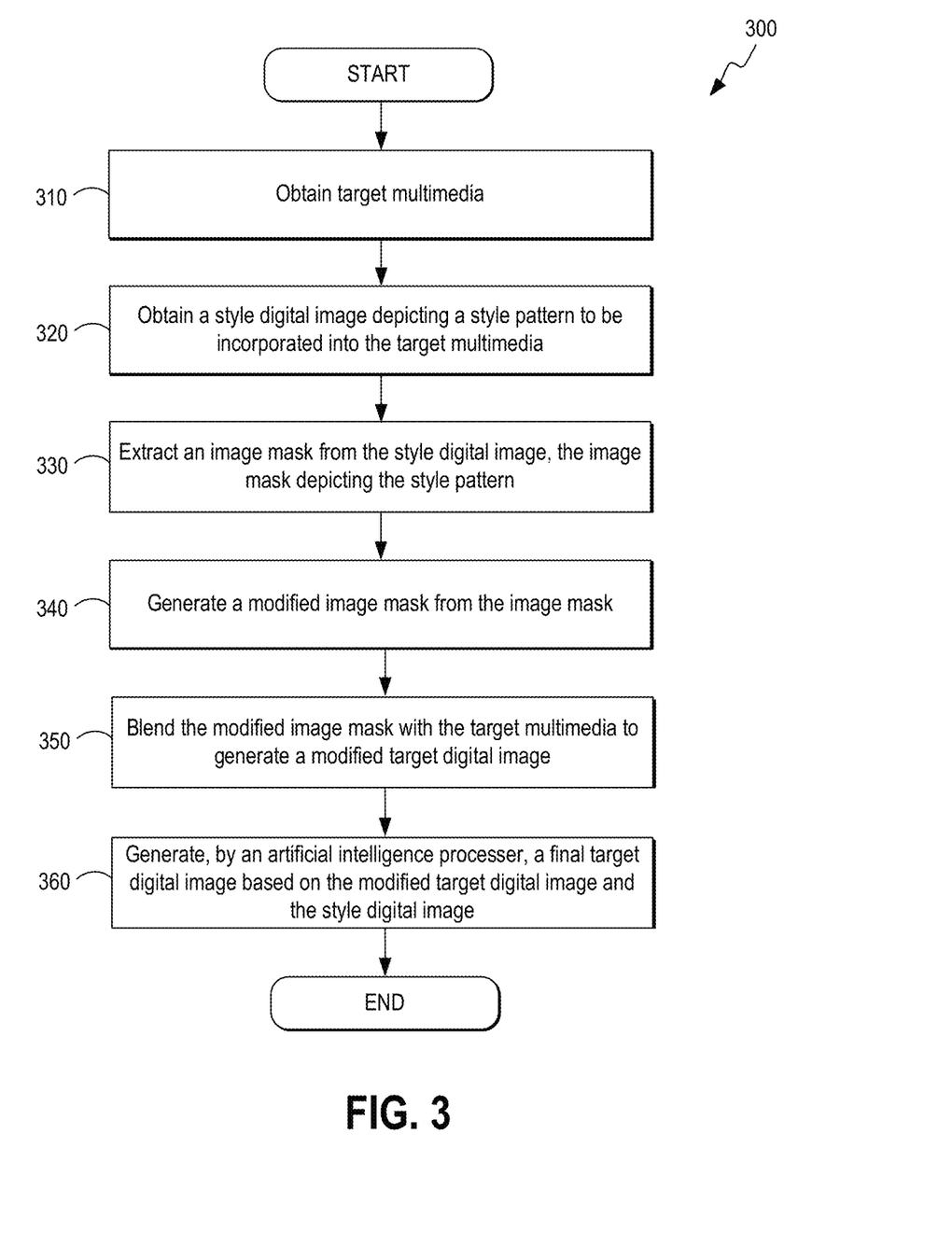
FIG. 3 is a top-level flowchart illustrating examples of functionality implemented as portions of the computing device of FIG. 1 for image style transfer using image mask pre-processing according to various embodiments of the present disclosure.

Reference is made to FIG. 3, which is a flowchart 300 in accordance with various embodiments for image style transfer using image mask pre-processing performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 obtains target multimedia, which may comprise a digital image or a digital video. At block 320, the computing device 102 obtains a style digital image depicting a style pattern (e.g., painting, fabric texture, painting style of a famous painter, pattern) to be incorporated into the target multimedia. At block 330, the computing device 102 extracts an image mask from the style digital image, the image mask depicting the style pattern. For some embodiments, the computing device 102 extracts the image mask from the style digital image by defining a region of interest within the style digital image and cropping the style digital image to the region of interest and outputting the image mask.

For some embodiments, the computing device 102 defines the region of interest within the style digital image based on user input, where the user input may manually define a region within the style digital image to emphasize. For other embodiments, the computing device 102 automatically defines the region of interest within the style digital image using an artificial intelligence technique or a machine learning technique.

At block 340, the computing device 102 generates a modified image mask from the image mask. For some embodiments, the computing device 102 generates the modified image mask from the image mask by generating a gray scale version of the image mask as the modified image mask. The gray scale version of the image mask may be obtained based on the following expression:

$$I(x)=(R+G+B)/3, \text{ where } x=1 \text{ to } N,$$

where I(x) represents each pixel in the gray scale version of the image mask, N represents the total number of pixels in the gray scale version of the image mask, and R, G, B respectively represent red, green, blue color values for each pixel in the gray scale version of the image mask.

At block 350, the computing device 102 blends the modified image mask with the target multimedia to generate a modified target digital multimedia. For some embodiments, the computing device 102 blends the modified image mask with the target multimedia by alpha-blending the modified image mask with the target multimedia to generate the modified target digital multimedia. Specifically, the computing device 102 performs alpha-blending in accordance with the following expression:

$$I_{blend}(y)=\alpha F(x)+(1-\alpha)B(y), \text{ where } 0 \le \alpha \le 1,$$

where x=1 to M, y=1 to N,

The expression $I_{blend}(y)$ represents each pixel in the modified target digital multimedia, wherein M represents a total number of pixels in the modified image mask, N represents a total number of pixels in the target multimedia, wherein a represents an alpha component, wherein F(x) represents each pixel in the modified image mask, and wherein B(y) represents each pixel in the target multimedia.

At block 360, the computing device 102 generates, by an artificial intelligence processor, a final target digital multimedia based on the modified target digital multimedia and the style digital image. For some embodiments, the computing device 102 generates the final target digital multimedia by extracting, by the artificial intelligence processor, the style pattern of the style digital image and applying the extracted style pattern to the modified target digital multimedia to generate the final target digital multimedia. Thereafter, the process in FIG. 3 ends.

Figure 4:
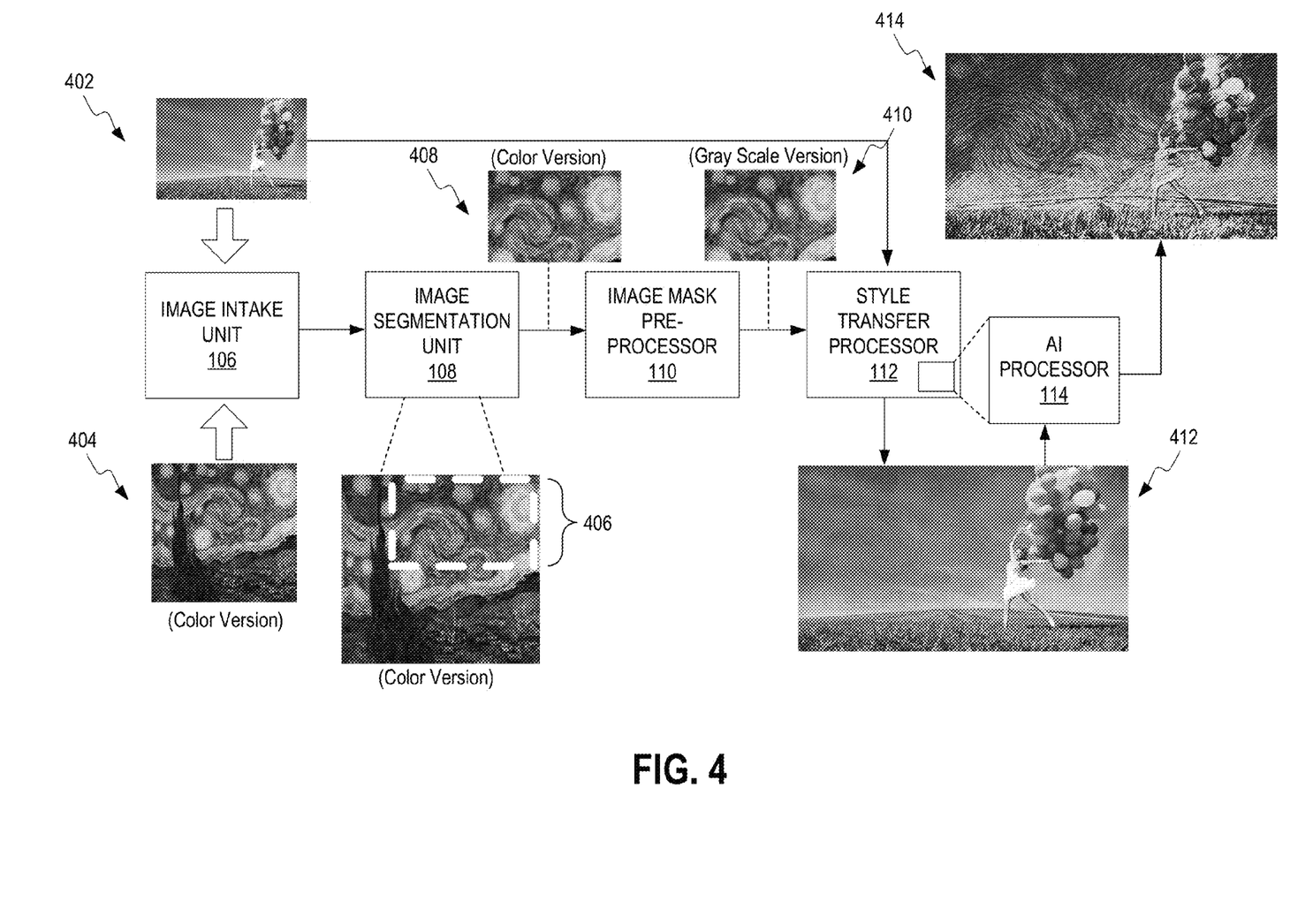
FIG. 4 illustrates the signal flow between different components in the computing device of FIG. 1 for performing image style transfer using image mask pre-processing according to various embodiments of the present disclosure.

Having described the basic framework of a system for performing image style transfer, reference is made to FIG. 4, which illustrates the signal flow between different components in the computing device 102 of FIG. 1 for performing image style transfer using image mask pre-processing according to various embodiments of the present disclosure. To begin, the image intake unit 106 executing in the computing device 102 obtains target multimedia 402. The image intake unit 106 also obtains a style digital image 404 depicting a style pattern to be incorporated into the target multimedia. Note that although FIG. 4 shows the image intake unit 106 obtaining a style digital image 404 depicting content in color, the image intake unit 106 can alternatively obtain style digital images 404 depicting black and white or gray scale content.

The image intake unit 106 forwards the style digital image 404 to the image segmentation unit 108, which then extracts an image mask 408 from the style digital image, where the image mask 408 depicts the style pattern. For some embodiments, the image segmentation unit 108 extracts the image mask 408 from the style digital image by defining a region of interest 406 within the style digital image and cropping the style digital image to the region of interest 406 and outputting the image mask 408 to the image mask pre-processor 110.

For some embodiments, the image segmentation unit 108 defines the region of interest 406 within the style digital image based on user input obtained by displaying a user interface (not shown), where the user input may manually define a region of interest 406 within the style digital image to emphasize. For other embodiments, the image segmentation unit 108 automatically defines the region of interest 406 within the style digital image using an artificial intelligence technique or a machine learning technique.

The image mask pre-processor 110 generates a modified image mask 410 from the image mask 408 generated by the image segmentation unit 108. For some embodiments, the image mask pre-processor 110 generates the modified image mask 410 from the image mask 408 by generating a gray scale version of the image mask 408 as the modified image mask 410. Generating a gray scale version of the image mask 408 allows the image mask pre-processor 110 to extract the pattern information contained in the modified image mask 410 without extracting the color information. In general, the pattern information is more easily identified in a gray scale version of the image mask 408.

As discussed above, the gray scale version of the image mask may be obtained based on the following expression:

$$I(x)=(R+G+B)/3, \text{ where } x=1 \text{ to } N,$$

where I(x) represents each pixel in the gray scale version of the image mask 408, N represents the total number of pixels in the gray scale version of the image mask (i.e., the modified image mask 410), and R, G, B respectively represent red, green, blue color values for each pixel in the gray scale version of the image mask 408 (i.e., the modified image mask 410).

The style transfer processor 112 receives the target multimedia 402 from the image intake unit 106. The style transfer processor 112 also receives the modified image mask 410 output by the image mask pre-processor 110 and blends the modified image mask 410 with the target multimedia 402 to generate a modified target digital multimedia. For some embodiments, the style transfer processor 112 blends the modified image mask with the target multimedia 402 by alpha-blending the modified image mask 410 with the target multimedia 402 to generate the modified target digital multimedia 412. Specifically, the style transfer processor 112 performs alpha-blending in accordance with the following expression:

$$I_{blend}(y)=\alpha F(x)+(1-\alpha)B(y), \text{ where } 0 \le \alpha \le 1,$$

where x =1 to M, y=1to N, wherein $I_{blend}(y)$ represents each pixel in the modified target digital multimedia 412, wherein M represents a total number of pixels in the modified image mask 410, N represents a total number of pixels in the target multimedia, wherein a represents an alpha component, wherein F(x) represents each pixel in the modified image mask, and wherein B(y) represents each pixel in the target multimedia 402.

As shown, the modified target digital multimedia 412 output by the style transfer processor 112 depicts the desired style pattern depicted in the modified image mask 410 incorporated into the original content depicted in the modified target digital multimedia 412. The AI processor 114 generates a final target digital multimedia 414 based on the modified target digital multimedia 412 using an artificial intelligence technique or a machine learning technique. For some embodiments, the AI processor 114 generates the final target digital multimedia 414 based on the modified target digital multimedia 412 by extracting the style pattern of the style digital image 404 and applying the extracted style pattern to the modified target digital multimedia 412 to generate the final target digital multimedia 414.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in a computing device, comprising:
   obtaining target multimedia;
   obtaining a style digital image depicting a style pattern to be incorporated into the target multimedia;
   extracting an image mask from the style digital image, the image mask depicting the style pattern;
   generating a modified image mask from the image mask;
   blending the modified image mask with the target multimedia to generate a modified target digital multimedia, wherein blending the modified image mask with the target multimedia to generate the modified target digital multimedia comprises alpha-blending the modified image mask with the target multimedia to generate the modified target digital multimedia, wherein alpha-blending the modified image mask with the target multimedia to generate the modified target digital multimedia is performed based on:

$I_{blend}(y)=\alpha F(x)+(1-\alpha)B(y)$, where $0\leq\alpha\leq 1$, where x =1 to M, y=1 to N, wherein $I_{blend}(y)$ represents each pixel in the modified target digital multimedia, wherein M represents a total number of pixels in the modified image mask, N represents a total number of pixels in the target multimedia, wherein a represents an alpha component, wherein F(x) represents each pixel in the modified image mask, and wherein B(y) represents each pixel in the target multimedia; and
   generating, by an artificial intelligence processer, a final target digital multimedia based on the modified target digital multimedia and the style digital image.

2. The method of claim 1, wherein the target multimedia comprises one of: digital image or digital video.

3. The method of claim 1, wherein generating, by the artificial intelligence processer, the final target digital multimedia based on the modified target digital multimedia and the style digital image comprises:
   extracting, by the artificial intelligence processer, the style pattern of the style digital image; and
   applying the extracted style pattern to the modified target digital multimedia to generate the final target digital multimedia.

4. The method of claim 1, wherein extracting the image mask from the style digital image comprises:
   defining a region of interest within the style digital image; and
   cropping the style digital image to the region of interest and outputting the image mask.

5. The method of claim 4, wherein defining the region of interest within the style digital image is performed based on user input.

6. The method of claim 4, wherein defining the region of interest within the style digital image is performed using one of: an artificial intelligence technique; or a machine learning technique.

7. The method of claim 1, wherein generating the modified image mask from the image mask comprises generating a gray scale version of the image mask as the modified image mask.

8. The method of claim 7, wherein generating the gray scale version of the image mask is performed based on:

$I(x)=(R+G+B)/3$, where $x=1$ to $N$, wherein I(x) represents each pixel in the gray scale version of the image mask, wherein N represents a total number of pixels in the gray scale version of the image mask, and wherein R, G, B respectively represent red, green, blue color values for each pixel in the gray scale version of the image mask.

9. A system, comprising:
   a memory storing instructions;
   a processor coupled to the memory and configured by the instructions to at least:
      obtain target multimedia;
      obtain a style digital image depicting a style pattern to be incorporated into the target multimedia;
      extract an image mask from the style digital image, the image mask depicting the style pattern;
      generate a modified image mask from the image mask;
      blend the modified image mask with the target multimedia to generate a modified target digital multimedia, wherein the processor blends the modified image mask with the target multimedia to generate the modified target digital multimedia by alpha-blending the modified image mask with the target multimedia to generate the modified target digital multimedia, wherein the processor alpha-blends the modified image mask with the target multimedia to generate the modified target digital multimedia based on:

$I_{blend}(y)=\alpha F(x)+(1-\alpha)B(y)$, where $0\leq\alpha\leq 1$, where x=1 to M, y=1 to N, wherein $I_{blend}(y)$ represents each pixel in the modified target digital multimedia, wherein M represents a total number of pixels in the modified image mask, N represents a total number of pixels in the target multimedia, wherein α represents an alpha component, wherein F(x) represents each pixel in the modified image mask, and wherein B(y) represents each pixel in the target multimedia; and generate, by an artificial intelligence processer, a final target digital multimedia based on the modified target digital multimedia and the style digital image.

10. The system of claim 9, wherein the target multimedia comprises one of: digital image or digital video.

11. The system of claim 9, wherein the processor generates, by the artificial intelligence processor, the final target digital multimedia based on the modified target digital multimedia and the style digital image by:

extracting, by the artificial intelligence processer, the style pattern of the style digital image; and applying the extracted style pattern to the modified target digital multimedia to generate the final target digital multimedia .

12. The system of claim 9, wherein the processor extracts the image mask from the style digital image by:

defining a region of interest within the style digital image; and cropping the style digital image to the region of interest and outputting the image mask.

13. The system of claim 12, wherein the processor defines the region of interest within the style digital image based on user input.

14. The system of claim 12, wherein the processor defines the region of interest within the style digital image is performed using one of: an artificial intelligence technique; or a machine learning technique.

15. The system of claim 9, wherein the processor generates the modified image mask from the image mask by generating a gray scale version of the image mask as the modified image mask.

16. The system of claim 15, wherein the processor generates the gray scale version of the image mask based on:

$I(x)=(R+G+B)/3$, where $x=1$ to $N$, wherein I(x) represents each pixel in the gray scale version of the image mask, wherein N represents a total number of pixels in the gray scale version of the image mask, and wherein R, G, B respectively represent red, green, blue color values for each pixel in the gray scale version of the image mask.

17. A non-transitory computer-readable storage medium storing instructions to be implemented by a computing device having a processor, wherein the instructions, when executed by the processor, cause the computing device to at least:

obtain target multimedia;

obtain a style digital image depicting a style pattern to be incorporated into the target multimedia;

extract an image mask from the style digital image, the image mask depicting the style pattern;

generate a modified image mask from the image mask;

blend the modified image mask with the target multimedia to generate a modified target digital multimedia, wherein the processor blends the modified image mask with the target multimedia to generate the modified target digital multimedia by alpha-blending the modified image mask with the target multimedia to generate the modified target digital multimedia, wherein the processor alpha-blends the modified image mask with the target multimedia to generate the modified target digital multimedia based on:

$I_{blend}(y)=\alpha F(x)+(1-\alpha)B(y)$, where $0 \leq \alpha \leq 1$, where $x=1$ to M, $y=1$ to N, wherein $I_{blend}(y)$ represents each pixel in the modified target digital multimedia, wherein M represents a total number of pixels in the modified image mask, N represents a total number of pixels in the target multimedia, wherein a represents an alpha component, wherein F(x) represents each pixel in the modified image mask, and wherein B(y) represents each pixel in the target multimedia; and generate, by an artificial intelligence processer, a final target digital multimedia based on the modified target digital multimedia and the style digital image.

* * * * *